United States Patent [19]
Nagai

[11] Patent Number: 5,832,082
[45] Date of Patent: Nov. 3, 1998

[54] PORTABLE TELEPHONE SET HOLDER

[75] Inventor: Michio Nagai, Tokyo, Japan

[73] Assignee: NEC Corporation, Tokyo, Japan

[21] Appl. No.: 916,479

[22] Filed: Aug. 22, 1997

Related U.S. Application Data

[63] Continuation of Ser. No. 536,945, Sep. 29, 1995, abandoned.

[30] Foreign Application Priority Data

Sep. 30, 1994 [JP] Japan ................................. 6-261326

[51] Int. Cl.⁶ ............................. H04M 1/00; H04M 9/00
[52] U.S. Cl. ...................... 379/449; 379/426; 379/446; 379/449; 379/454; 379/455
[58] Field of Search ..................... 379/426, 446, 379/449, 454, 455

[56] References Cited

U.S. PATENT DOCUMENTS

| | | | |
|---|---|---|---|
| 4,640,542 | 2/1987 | Watjer et al. ........................... | 296/37.8 |
| 5,189,698 | 2/1993 | Hakanen ................................. | 379/455 |
| 5,305,381 | 4/1994 | Wang et al. ............................ | 379/455 |
| 5,388,155 | 2/1995 | Smith ..................................... | 379/446 |
| 5,463,688 | 10/1995 | Wijas ..................................... | 379/446 |

FOREIGN PATENT DOCUMENTS

| | | |
|---|---|---|
| 0545670 | 6/1993 | European Pat. Off. . |
| 0545672 | 9/1993 | European Pat. Off. . |
| 0585011 | 3/1994 | European Pat. Off. . |
| 64-42965 | 2/1989 | Japan . |
| 3-85949 | 4/1991 | Japan . |
| 4-19850 | 2/1992 | Japan . |
| 6-23355 | 3/1994 | Japan . |

OTHER PUBLICATIONS

Great Britain Search Report dated Dec. 12, 1995.

*Primary Examiner*—Jack Chiang
*Assistant Examiner*—Allan Hoosain
*Attorney, Agent, or Firm*—Scully, Scott, Murphy & Presser

[57] ABSTRACT

A portable telephone set holder includes a portable telephone set, a housing, and a catch latch. The portable telephone set has a first engaging portion formed on one end face, and a grip portion formed at least one remaining end face. The housing has a storing portion in which a second engaging portion to be engaged with the first engaging portion is formed and the portable telephone set is stored. The catch latch holds the grip portion to fix and hold the portable telephone set in the storing portion when the portable telephone set placed on the storing portion is depressed while the first and second engaging portions are engaged with each other. The catch latch unlocks the grip portion to release the portable telephone set from the storing portion when the portable telephone set fixed and held in the storing portion is depressed.

10 Claims, 8 Drawing Sheets

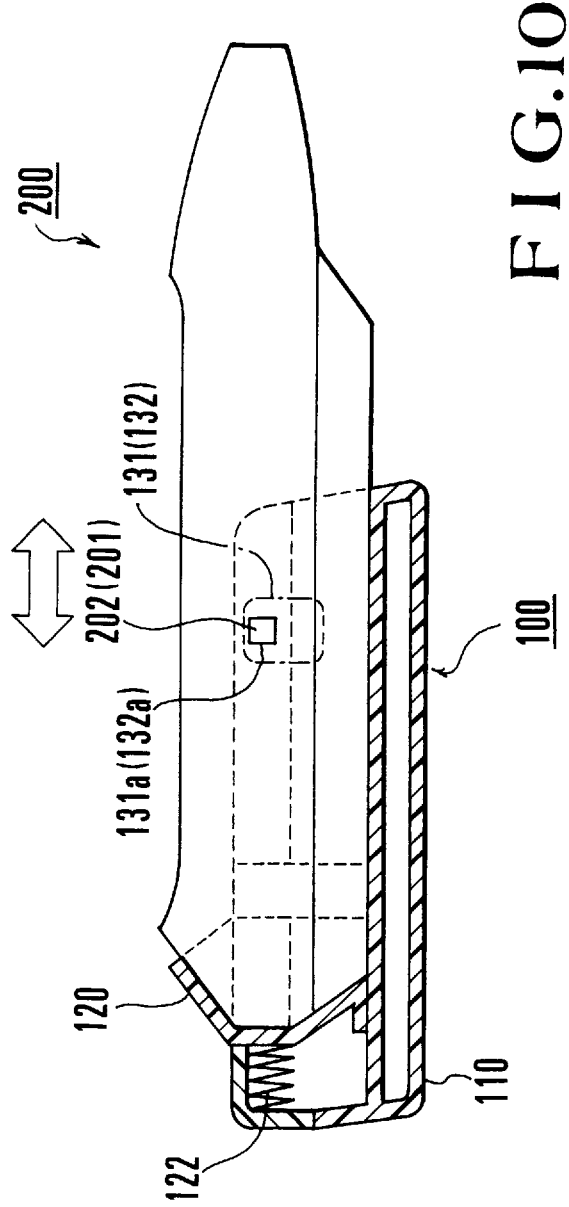

PORTABLE TELEPHONE SET HOLDER

This application is a continuation, of application Ser. No. 08/536,945 filed Sep. 29, 1995, now abandoned.

BACKGROUND OF THE INVENTION

The present invention relates to a portable telephone set holder and, more particularly, to a portable telephone set holder which can reliably hold a portable telephone set even if a vehicle swings or vibrates, and allows a user to attach/detach the portable telephone set with the sense of handling the handset of a general telephone set.

A conventional portable telephone set holder will be described below with reference to FIGS. 7, 8, and 9.

FIG. 7 shows the conventional portable telephone set holder disclosed in Japanese Utility Model Laid-Open No. 6-23355. FIGS. 8 and 9 show the operation of the portable telephone set holder in FIG. 7.

Referring to FIG. 7, a conventional portable telephone set holder 100 comprises a two piece holder body 110, in which a case member 120 is mounted on the central portion of the two piece holder body 110 through a fulcrum 121 and can freely swing about the fulcrum 121 in the vertical direction through a spring 122 disposed on the rear surface side, and a pair of release buttons 131 and 132 disposed on side wall portions of the two piece holder body 110 and having hooks 131a and 132a protruding inward in the two piece holder body 110.

A pair of engaging recess portions 201 and 202 which are respectively engaged with the hooks 131a and 132a of the release buttons 131 and 132 are formed in side surfaces of a portable telephone set 200.

The operation of the conventional portable telephone set holder having the above arrangement will be described next with reference to FIGS. 8 and 9.

As shown in FIG. 8, one end portion of the portable telephone set 200 is inserted into the case member 120 of the portable telephone set holder 100, and the portable telephone set 200 is depressed.

As shown in FIG. 9, the recess portions 201 and 202 of the portable telephone set 200 are then engaged with the hooks 131a and 132a of the release buttons 131 and 132, and the portable telephone set 200 is locked to the portable telephone set holder 100. Therefore, the portable telephone set 200 is first inserted into the case number 120 before the case member 120 can be rotated until it locks into the two piece holder body 110.

When the portable telephone set 200 is to be detached from the portable telephone set holder 100, the release buttons 131 and 132 are depressed to disengage the hooks 131a and 132a from the recess portions 201 and 202. As a result, the case member 120 is pushed upward by the spring 122 to allow the user to detach the portable telephone set 200 in an inclined state, as shown in FIG. 8. Therefore, the case member 120 needs to be first rotated from within the two piece holder body 110 before the portable telephone set 200 can be removed from the case member 120.

FIG. 10 shows another conventional portable telephone set holder. In this conventional portable telephone set holder 100, a spring 122 is horizontally mounted on a two piece holder body 110 to be brought into contact with the rear end of a case member 120. With this arrangement, the case member 120 is slidable in the horizontal direction indicated by an arrow B.

According to the conventional portable telephone set holder 100 having this arrangement, a portable telephone set 200 stored in the case member 120 is pushed in the horizontal direction to be locked to the portable telephone set holder 100. The portable telephone set 200 is unlocked by depressing release buttons 131 and 132 to be detached from the portable telephone set holder 100.

The prior art portable telephone holder 100 shown in FIG.'s 8 and 9 and the prior art portable telephone holder 100, shown in FIG. 10, require a two piece holder body 110 whereby the portable telephone set 200 engages a first piece of the two piece holder body (case member 120) before being locked into position into the two piece holder body 110.

A further disadvantage of the prior art portable telephone set holders 100 is that the portable telephone set holders require a lock mechanism like the one constituted by the hooks 131a and 132a, the recess portions 201 and 202, and the release buttons 131 and 132 of the conventional portable telephone set holder 100 described above.

With such a lock mechanism, however, the portable telephone set 200 cannot be unlocked without depressing the release buttons 131 and 132. That is, the portable telephone set 200 cannot be detached with the sense of handling the handset of a general telephone set.

In addition, since the portable telephone set 200 cannot be unlocked without depressing the release buttons 131 and 132, a cumbersome operation is required to detach the portable telephone set 200. Furthermore, the portable telephone set holder 100 cannot be installed in a place where the release buttons 131 and 132 are difficult to depress, imposing limitations on a place for installation.

Furthermore, since the portable telephone set 200 needs to engage a case member 120 before being rotated (FIGS. 8 and 9) or slid (FIG. 10) into a two piece holder body 120, the operation required to attach and detach the portable telephone sets of the prior art do not allow the portable telephone sets to be handled with the sense of handling a handset of a general telephone handset.

Japanese Patent Laid-Open No. 64-42965 (Japanese Paten Laid-Open No. 1-42965) discloses a technique of pivoting a holder and raising one end side of a handset portion by depressing a push switch. Japanese Patent Laid-Open No. 3-85949 discloses a technique of detaching a holder which is holding a portable telephone set from a mount base by depressing a push switch. These conventional techniques also require push buttons, and cannot allow the user to detach the portable telephone set from the holder with a one-touch operation.

A vehicle telephone set is disclosed in Japanese Utility Model Laid-Open No. 4-19850. This telephone set includes a holder for holding a portable telephone set in a storing portion, and a push lock mechanism for pushing out the holder. This storing portion is formed in a vehicle electronic device such as an audio unit to detachably store the portable telephone set.

According to the vehicle telephone set disclosed in Japanese Utility Model Laid-Open No. 4-19850, when the portable telephone set stored in the storing portion is pushed into the vehicle electronic device, the lock of the push mechanism is released, and the portable telephone set is pushed out from the vehicle electronic device by the holder. The portable telephone set therefore can be taken out without depressing release buttons or the like.

In the vehicle telephone set disclosed in Japanese Utility Model Laid-Open No. 4-19850, however, the portable telephone set cannot be detached with the sense of handling the handset of a general telephone set. That is, the conventional problem described above still remains unsolved.

SUMMARY OF THE INVENTION

It is an object of the present invention to provide a portable telephone set holder which can reliably hold a portable telephone set even if a vehicle swings or vibrates, and allows a user to attach/detach the portable telephone set with a one-touch operation with the sense of handling the handset of a general telephone set.

It is a further object of the present invention to provide a portable telephone set holder which eliminates the two piece holder body design of the prior art, substituting a single piece holder body design which allows handing of the portable telephone set with the sense of handling the handset of a general telephone set.

In order to achieve the above objects, according to the present invention, there is provided a portable telephone set holder comprising a portable telephone set having a first engaging portion formed on one end face, and a grip portion formed at least one remaining end face, a single piece housing having a storing portion in which a second engaging portion to be engaged with the first engaging portion is formed and the portable telephone set is stored, and catch latch means for holding the grip portion to fix and hold the portable telephone set in the storing portion when the portable telephone set placed on the storing portion is depressed while the first and second engaging portions are engaged with each other, and for unlocking the grip portion to release the portable telephone set from the storing portion when the portable telephone set fixed and held in the storing portion is depressed.

BRIEF DESCRIPTION OF THE DRAWINGS

FIG. 10 is a sectional side view showing another conventional portable telephone set holder.

DESCRIPTION OF THE PREFERRED EMBODIMENTS

Portable telephone set holders according to embodiments of the present invention will be described below with reference to the accompanying drawings.

A portable telephone set holder according to the first embodiment will be described first with reference to FIGS. 1 to 5C.

Figure 1:
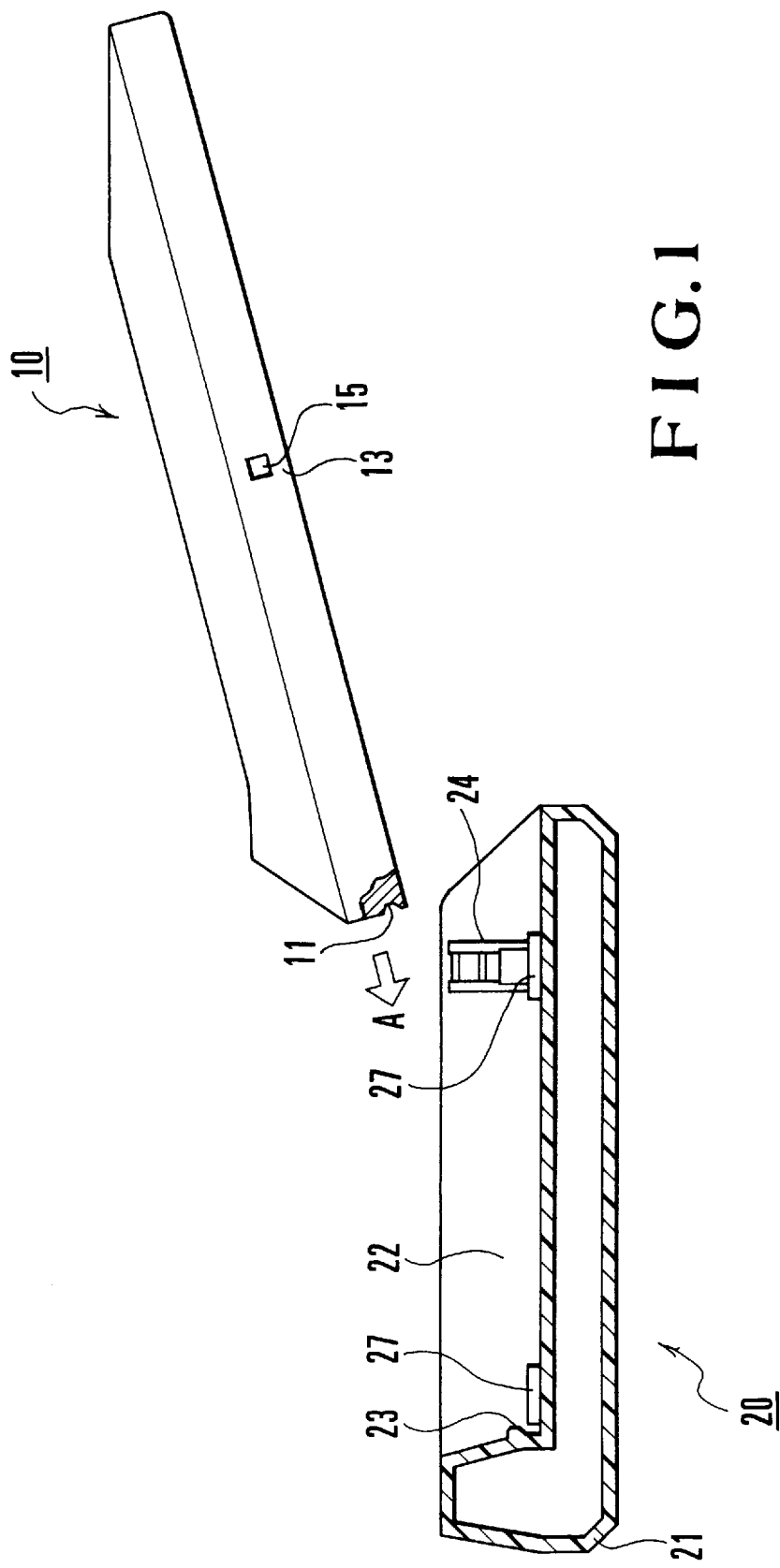
FIG. 1 is a partially sectional side view showing a portable telephone set holder according to an embodiment of the present invention.
Figure 4A:
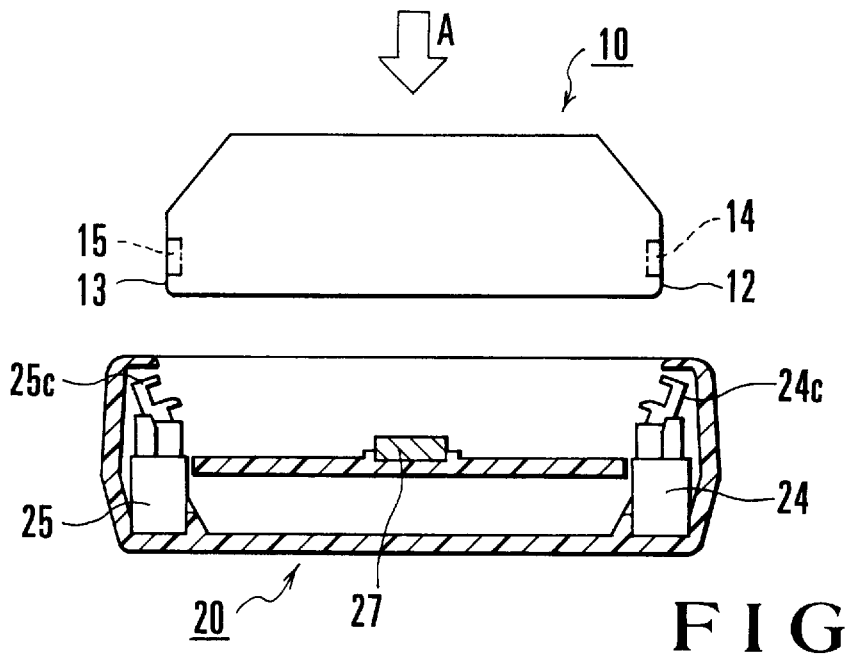
FIGS. 4A to 4C are cross-sectional views showing the attaching/detaching operation of the portable telephone set with respect to the portable telephone set holder in FIG. 1.

Referring to FIG. 1, reference numeral 10 denotes a portable telephone set held and fixed on a portable telephone set holder (to be referred to as a holder hereinafter) 20. An engaging recess portion (first engaging portion) 11 is formed on the front end face of the portable telephone set 10 in the direction in which it is mounted on the holder 20. As shown in FIG. 4A, a pair of recess portions 14 and 15 are formed in two side surfaces of the portable telephone set 10. Grip portions 12 and 13 are constituted by the thick portions between these recess portions 14 and 15 and the bottom surface.

A single piece housing 21 of the holder 20 has a storing portion 22 corresponding to the shape of the portable telephone set 10. An engaging projection portion (second engaging portion) 23 to be engaged with the engaging recess portion 11 is formed in the rear end portion of the storing portion 22.

Catch latches 24 and 25 respectively corresponding to the grip portions 12 and 13 of the portable telephone set 10 are formed on both sides of the storing portion 22.

Since these catch latches 24 and 25 have the same arrangement, only the catch latch 25 will be described with reference to FIGS. 5A to 5C.

Figures 5A, 5B, 5C:
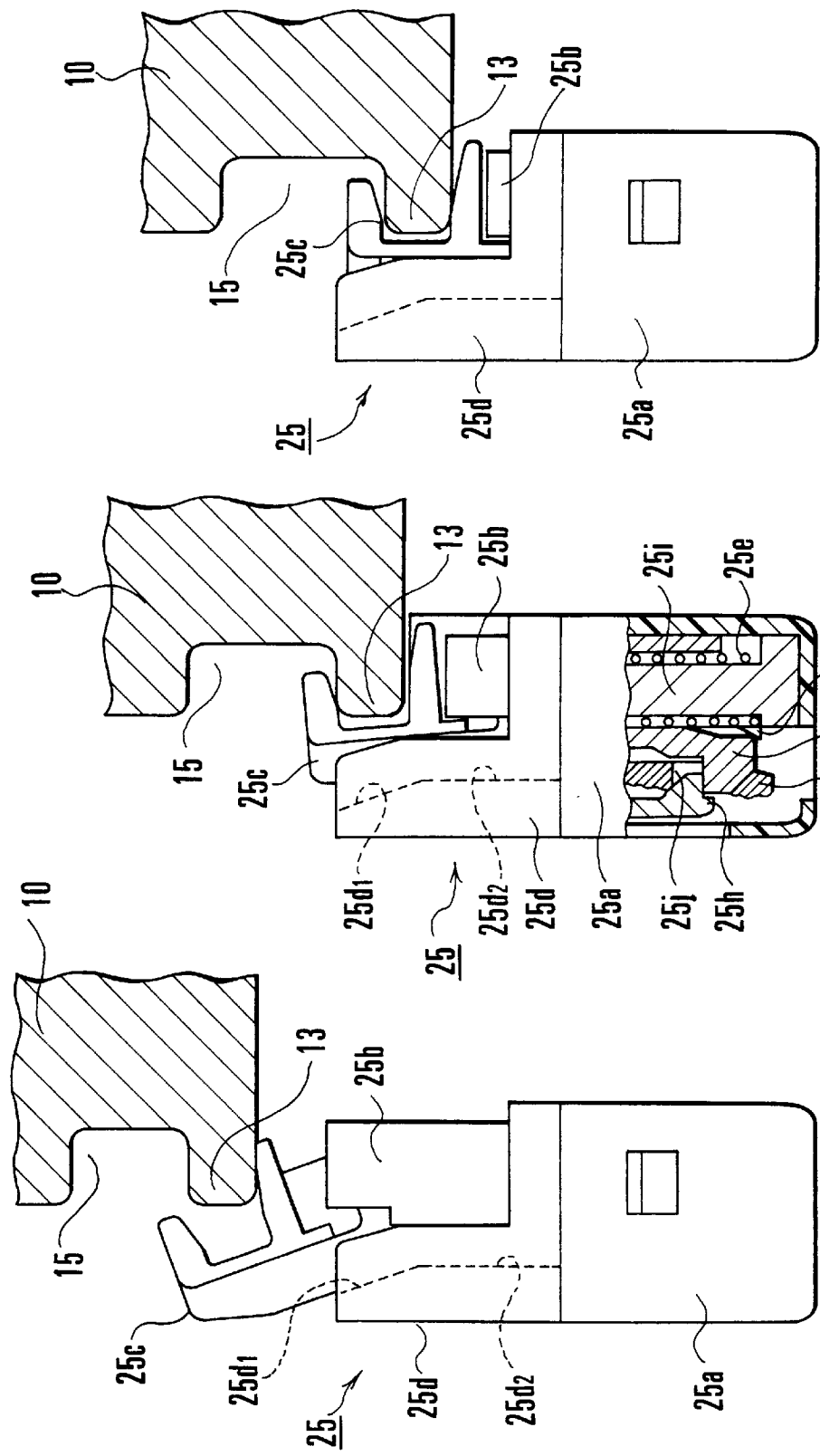
FIGS. 5A to 5C are partial enlarged views showing the operation of a catch latch in FIG. 1.

Referring to FIG. 5B, a fixed support shaft 25i, a snap member 25h whose upper portion is swingably supported, and a cam member 25g whose upper portion is swingably supported are disposed in a case portion 25a of the catch latch 25. A tapered hole 25j having a tapered surface is formed in the cam member 25g. The front end portion of the snap member 25h is positioned in the tapered hole 25j. A vertically movable shaft portion 25b biased upward by a spring 25e is mounted on the support shaft 25i. A latch member 25f is formed on the shaft portion 25b. The lower end portion of the latch member 25f is positioned to correspond to the tapered hole 25j of the cam member 25g at the position where the portable telephone set 10 is fixed and held. An inclined portion 25k is formed integrally with the support shaft 25i at a position almost corresponding to the tapered surface of the snap member 25h of the cam member 25g. With this arrangement, when the shaft portion 25b is depressed from the position where the portable telephone set 10 is fixed and held, the front end of the latch member 25f slides to depress the cam member 25g and sideward through the tapered surface of snap member 25h.

The operation of the catch latch 25 having the above arrangement will be described next with reference to FIGS. 5A to 5C. When the shaft portion 25b is depressed upon depression of the portable telephone set 10 in the free state shown in FIG. 5A, the latch member 25f descends while sliding on the upper portion of the cam member 25g to enter snap member 25h of the cam member 25g. The latch member 25f is then engaged with the snap member 25h in latch member 25f to be locked. With this operation, as shown in FIG. 5B, the shaft portion 25b is fixed in a pushed state by the biasing force of the spring 25e.

When the shaft portion 25b in the locked state in FIG. 5B is further depressed into the state shown in FIG. 5C, the front end portion of the latch member 25f slides downward on the inclined portion 25k to depress the cam member and sideward through the tapered surface of the tapered hole 25j. The pressed cam member swings in a direction to separate from the latch member 25f, and the tapered portion of the snap member 25h is pushed by the upper end portion of the tapered hole 25j. As a result, snap member 25h moves outside the tapered hole 25j. Upon movement of the snap member 25h, the latch memberf 25f is unlocked, and the shaft portion 25b is restored to the free state in FIG. 5A by the biasing force of the spring 25e.

When the shaft portion 25b in the state shown in FIG. 5C is to be restored to the state shown in FIG. 5A, since the latch member 25f is designed not to enter the tapered hole 25j of the cam member 25g, the latch member 25f is not engaged with the snap member 25h in the process of restoration. In addition, if the downward movement of the latch member 25f alone allows sufficient swinging movement of the cam member 25g, the inclined portion 25k may be omitted.

U-shaped grip pawl 25c is pivotally mounted on the upper end of the shaft portion 25b. A tapered wall portion 25d having a tapered surface 25d1 and a vertical surface 25d2 which are brought into contact with the back of the grip pawl 25c is formed on the upper portion of the case portion 25a.

With the above arrangement constituted by the grip pawl 25c and the tapered wall portion 25d, when the shaft portion 25b is in the free state as shown in FIG. 5A, the grip pawl 25c is inclined outward along the tapered wall portion 25d by gravity. When the shaft portion 25b is depressed as shown in FIGS. 5B and 5C, the grip pawl 25c is guided by the vertical surface 25d2 to be set in the vertical posture. Note that the grip pawl 25c may be inclined outward by a spring.

Figure 4B:
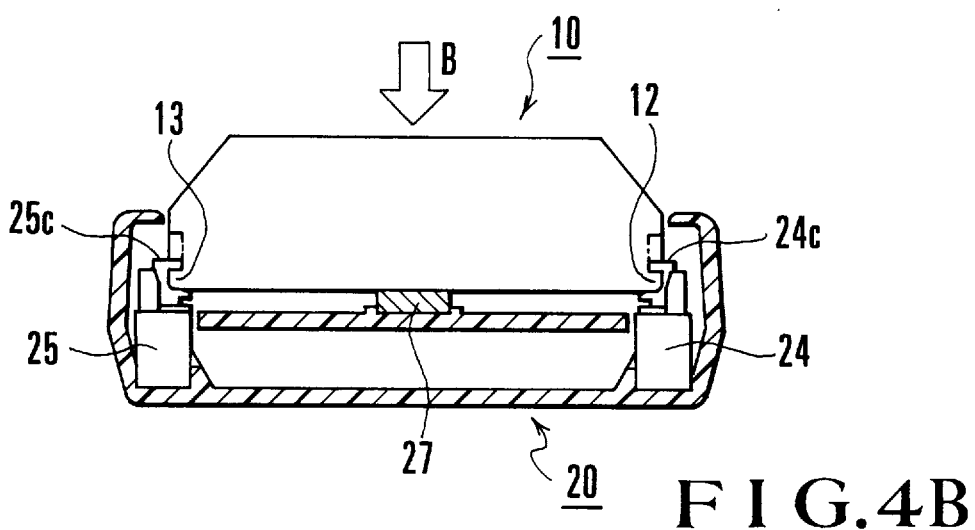

That is, when the shaft portion 25b is in the free state, the grip pawl 25c releases the portable telephone set 10. When the shaft portion 25b is depressed, the grip pawl 25c holds the grip portion 13. At this time, as shown in FIG. 4B, since a grip pawl 24c holds the grip portion 12, the portable telephone set 10 is fixed in the storing portion 22 at three points.

Reference numeral 27 denotes a cushion fixed on the upper surface of the portable telephone set holder 20 in correspondence with the engaging projection portion 23 and the catch latches 24 and 25. When the portable telephone set 10 is fixed with the catch latches 24 and 25, the cushion 27 is brought into contact with the rear surface of the portable telephone set 10 to support the portable telephone set 10 so as to prevent its removal. The cushion 27 also serves as a buffer member between the portable telephone set holder 20 and the portable telephone set 10.

When the catch latches 24 and 25 are to be unlocked, the portable telephone set 10 is depressed. The elasticity of the cushion 27 allows downward movement of the portable telephone set 10 when the catch latches 24 and 25 are unlocked.

The operation of the holder 20 of this embodiment having the above arrangement will be described next with reference to FIGS. 1 to 5C by taking the case of the catch latch 25 side. The catch latch 24 operates almost in synchronism with the catch latch 25.

A case wherein the portable telephone set 10 is mounted on the holder 20 will be described first.

As shown in FIGS. 1 to 4A, the portable telephone set 10 is moved in the direction indicated by an arrow A to engage the engaging recess portion 11 with the engaging projection portion 23 of the holder 20.

Figure 2:
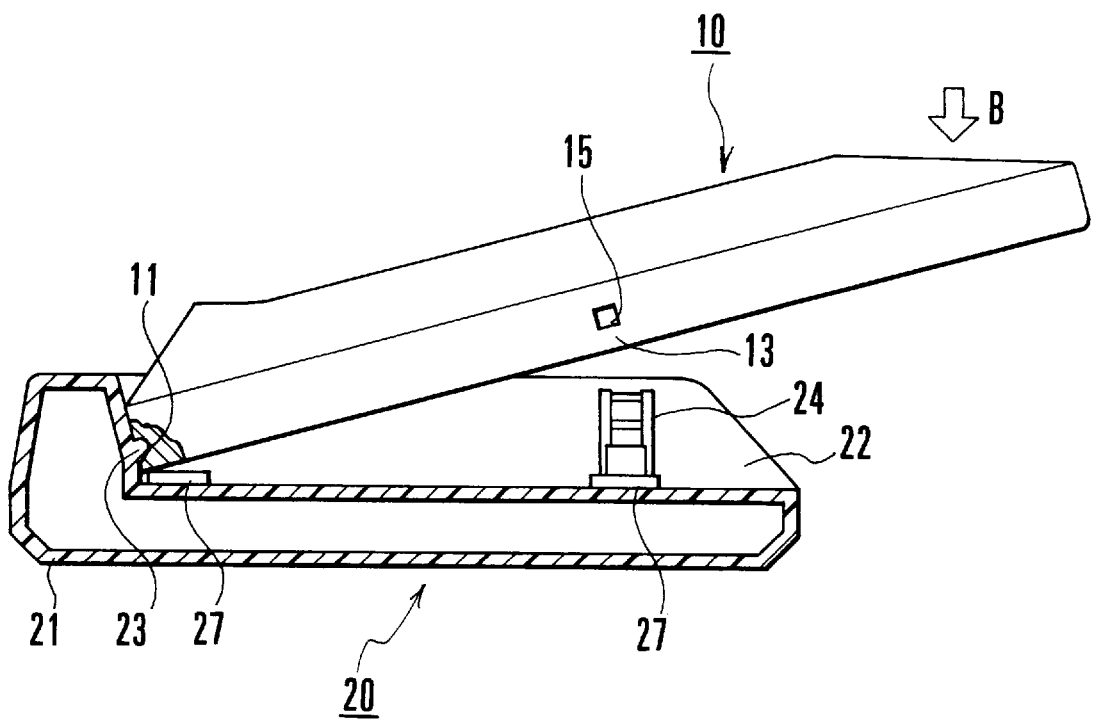
FIG. 2 is a partially sectional side view showing the attaching/detaching operation of a portable telephone set with respect to the portable telephone set holder in FIG. 1.

When the rear end side of the portable telephone set 10 is depressed in the direction indicated by the arrow B as shown in FIG. 2, the rear surface of the grip portion 13 of the portable telephone set 10 is brought into contact with the grip pawl 25c of the catch latch 25.

When the portable telephone set 10 is further depressed, the shaft portion 25b of the catch latch 25 is depressed, as shown in FIG. 5B. As a result, the shaft portion 25b is locked in a depressed state while the grip portion 13 is held by the grip pawl 25c.

Figure 3:
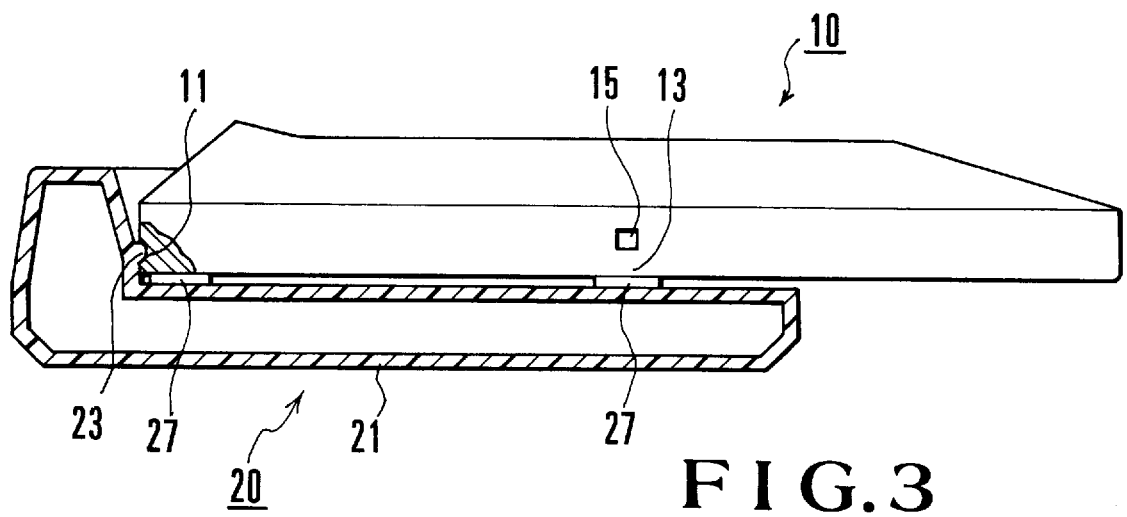
FIG. 3 is a partially sectional side view showing the attaching/detaching operation of the portable telephone set with respect to the portable telephone set holder in FIG. 1.

With this operation, as shown in FIGS. 3 and 4B, the portable telephone set 10 is fixed and held on the portable telephone set holder 20.

A case wherein the portable telephone set 10 is detached from the portable telephone set holder 20 will be described next.

When the portable telephone set 10 in the state shown in FIGS. 3 and 4B is further depressed, the shaft portion 25b of the catch latch 25 is depressed and unlocked, as shown in FIG. 5C.

Figure 4C:
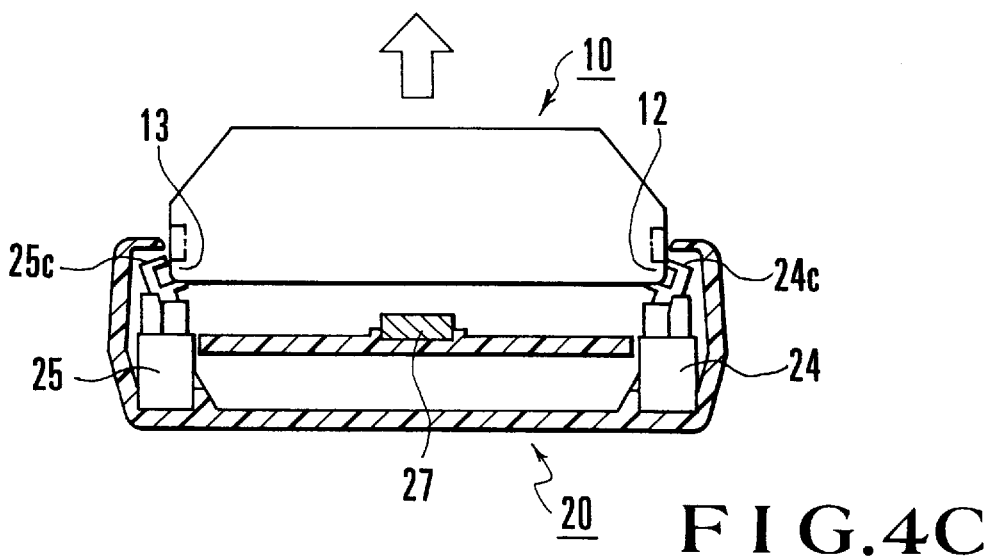

With this operation, the shaft portion 25b is pushed upward by the spring 25e, and the grip pawl 25c releases the grip portion 13, as shown in FIGS. 4C and 5A, thereby allowing the user to detach the portable telephone set 10.

According to the holder 20 of the first embodiment, which has the above arrangement, since the catch latches 24 and 25 having the grip pawls 24c and 25c are used as fixing means, the portable telephone set 10 can be reliably fixed without any release button or the like. In addition, the portable telephone set 10 can be attached/detached with a one-touch operation.

The portable telephone set 10 can be detached from the holder 20 with the sense of handling the handset of a general telephone set.

Furthermore, since the portable telephone set 10 is fixed at three points with the engaging recess portion 11 and the engaging projection portion 23, and the grip portions 12 and 13 and the grip pawls 24c and 25c, the portable telephone set can be reliably held even if the vehicle swings or vibrates.

Figure 6:
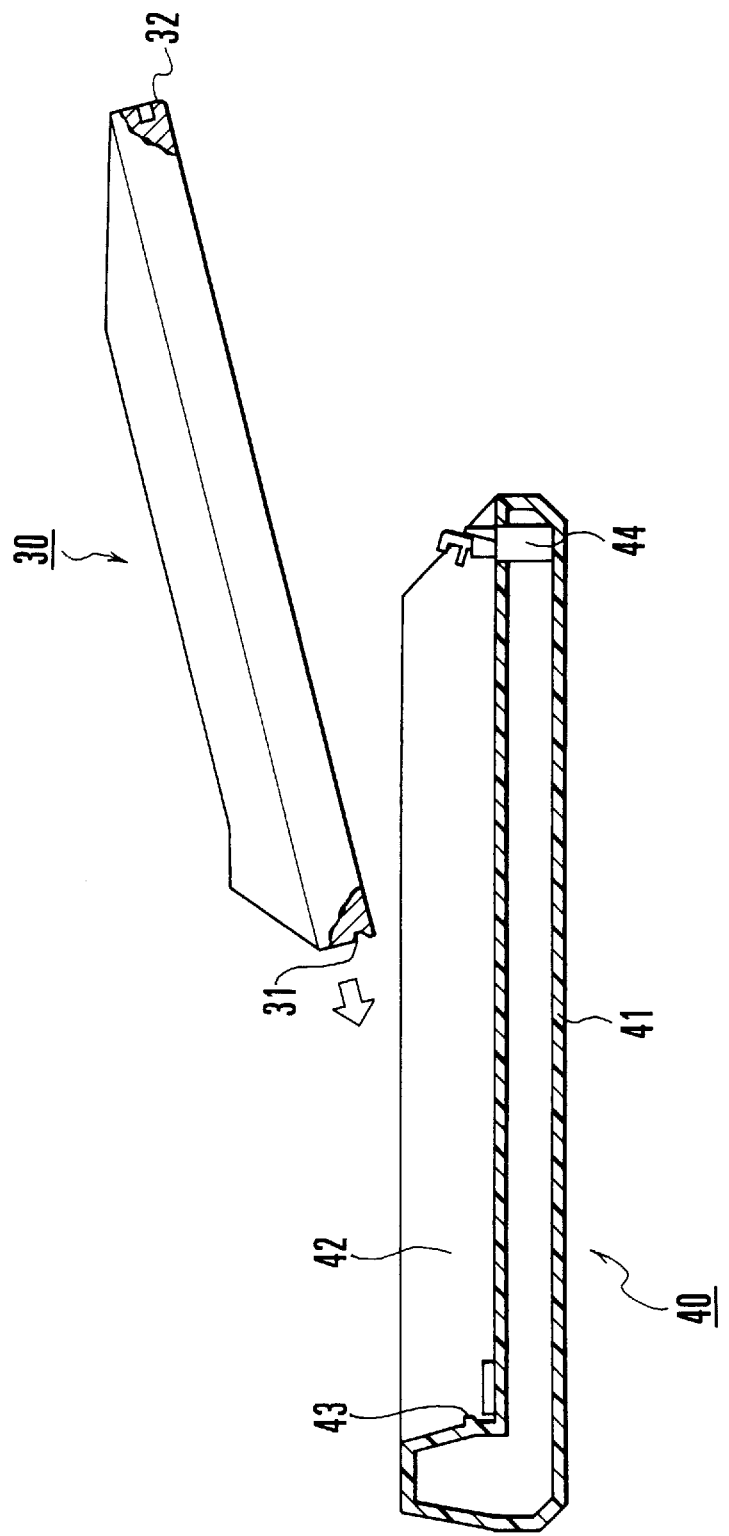
FIG. 6 is a partially sectional side view showing a portable telephone set holder according to the second embodiment of the present invention.
Figure 7:
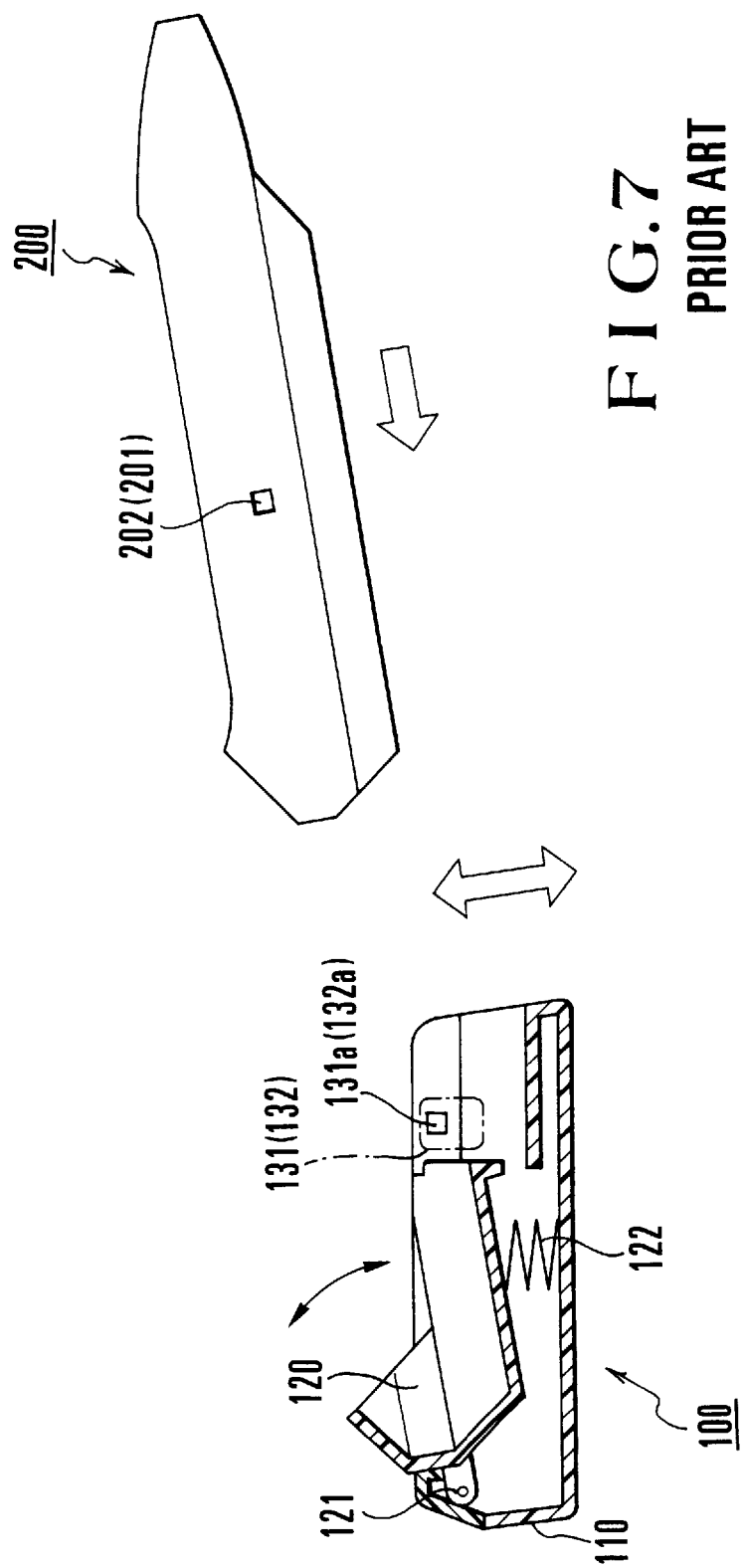
FIG. 7 is a sectional side view showing a conventional portable telephone set holder.
Figure 8:
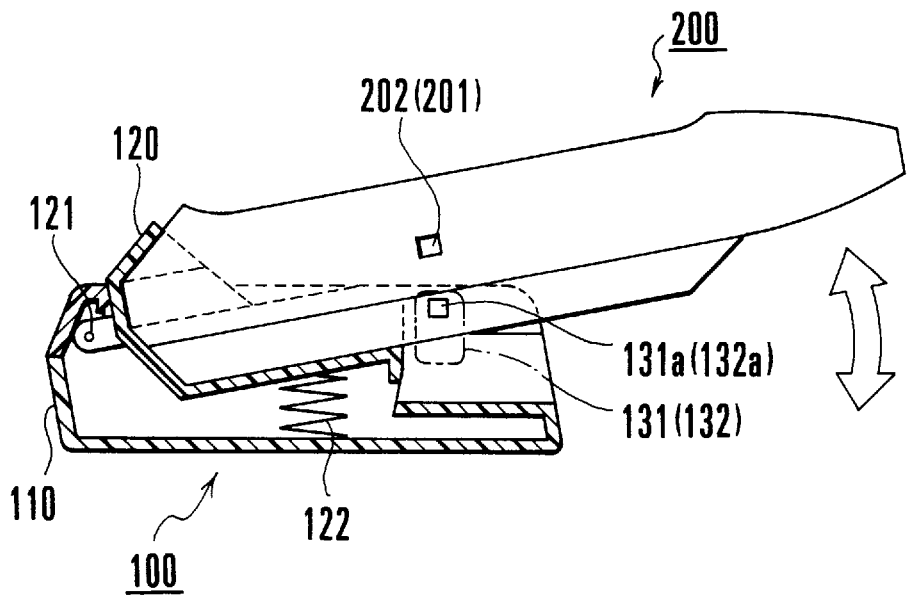
FIG. 8 is a sectional side view showing the operation of the conventional portable telephone set holder in FIG. 7.
Figure 9:
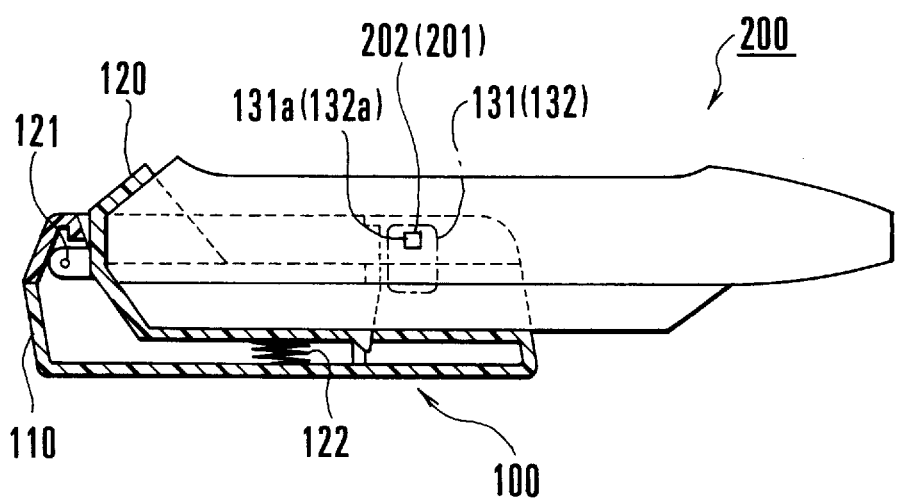
FIG. 9 is a sectional side view showing the operation of the conventional portable telephone set holder in FIG. 7.

A portable telephone set holder according to the second embodiment of the present invention will be described next with reference to FIG. 6.

A holder 40 of this embodiment has the following arrangement. An engaging recess portion (first engaging portion) 31 is formed on the front end of a portable telephone set 30 in the direction in which it is mounted, and a grip portion 32 is formed on the rear end of the portable telephone set 30. An engaging projection portion (second engaging portion) 43 to be engaged with the engaging recess portion 31 is formed on one end of a storing portion 42 of the holder 40, and a catch latch 44 for holding the grip portion 32 is formed on the other end of the storing portion 42.

According to the holder 40 of the second embodiment, which has the above arrangement, the same effects as those in the first embodiment can be obtained.

The portable telephone set holder of the present invention is not limited to those of the above embodiments.

In the above embodiments, the engaging recess portions 11 and 31 of the portable telephone sets 10 and 30 serve as the first engaging portions, and the engaging projection portions 23 and 43 of the portable telephone set holders 20 and 40 serve as the second engaging portions. However, the first engaging portions may be engaging projection portions, and the second engaging portions may be engaging recess portions.

The portable telephone set holder of the present invention allows easy attachment/detachment of the portable telephone set, and hence can be used for various devices as well as the portable telephone set. For example, this holder can be used as the battery holder of the portable telephone set.

As has been described above, according to the portable telephone set holder of the present invention, the portable telephone set can be reliably held even if the vehicle swings or vibrates, and can be detached with a one-touch operation with the sense of handling the handset of a general telephone set.

From the foregoing, it becomes readily apparent to one skilled in the art that the novel portable telephone set holder of the present invention offers advantages over currently employed devices. Due to the inventive single piece holder arrangement, the advantages offered by the inventive structure resides in:

(a) a portable telephone set holder which eliminates the necessity for release buttons allowing the portable telephone set holder of the present invention to be attached to, and detached from the holder with the sense of handling the handset of a general telephone set; and (b) the elimination of the two-piece holder design of the prior art portable telephone holders, instead substituting a novel single piece holder which further allows detaching and attaching of the portable telephone set with the sense of handing the handset of a general telephone set.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A portable telephone set holder comprising:
   a portable telephone set having a first engaging portion formed on one end face, and a grip portion formed on at least one remaining end face;
   a single piece housing having a storing portion in which a second engaging portion to be engaged with the first engaging portion is formed and said portable telephone set is stored; and
   catch latch means disposed in the storing position of the single piece housing for holding the grip portion to fix and hold said portable telephone set in a locked, storage position in the storing portion of the housing;
   wherein the catch latch means has at least one pivoting grip pawl for maintaining (i) a locking position for locking the telephone set in said storage position, and (ii) an unlocking position to allow the telephone set to move out of the storage position;
   wherein the telephone set is locked into the storage position by engaging the first and second engaging portions with each other, engaging the catch latch means with the grip portion, and moving the telephone set downwardly; and the catch latch means is moved from the locking position to the unlocking position by moving the telephone set further downward when the telephone set is held by the catch latch means in the storage position.

2. A holder according to claim 1, wherein said catch latch means comprises a shaft portion which is disposed in the storing portion to be vertically movable, a spring member for biasing the shaft portion upward, wherein the grip pawl has a U-Shape, the U-shaped grip pawl is disposed on an upper portion of the shaft portion to be pivotable between a locking position and an unlocking position, and holds the grip portion of said portable telephone set, and a latch mechanism for causing the U-shaped grip pawl to pivot to the unlocking position to be engaged/disengaged with/from the grip portion of said portable telephone set at a first position of the shaft portion, for locking the shaft portion against a biasing force of the spring member while holding the U-shaped grip pawl at the locking position to keep the U-shaped grip pawl engaged with the grip portion of said portable telephone set at a second position, of the shaft portion, which is lower than the first position, and for restoring the shaft portion to the first position with the biasing force of the spring member by unlocking the shaft portion at a third position, of the shaft portion, which is lower than the second position.

3. A holder according to claim 2, wherein said catch latch means further comprises a tapered wall portion having a tapered surface as an upper portion formed on the back side of the U-shaped grip pawl, and a vertical surface which continuously extends downward from the inclined surface, where the U-shaped grip pawl is supported by the inclined surface of the tapered wall portion and displaced to the unlocking position when the shaft portion is set at the first position, and is vertically supported by the vertical surface of the tapered wall portion and displaced to the locking position when the shaft portion is set at the second and third positions.

4. A holder according to claim 3, wherein said latch mechanism comprises a latch member which vertically moves together with the shaft portion, a snap member which is engaged with the latch member at the second position to lock the shaft portion against the biasing force of the spring member, and a cam member which engages the latch member displaced from the first position with the snap member at the second position, and disengages the latch member from the snap member as the latch member is displaced from the second position to the third position.

5. A holder according to claim 4, wherein the cam member has a tapered hole which the snap member faces and is brought into contact with a lower end face of the latch member locked at the second position, the latch member which is displaced from the first position to the second position enters the tapered hole of the cam member to be engaged with the snap member, and the latch member which is displaced from the second position to the third position presses the tapered surface of the tapered hole to displace the cam member in a direction in which the snap member is disengaged from the latch member.

6. A holder according to claim 1, further comprising an elastic member which is disposed on a bottom surface of the storing portion of said single piece housing and is brought into contact with a rear surface of said portable telephone set to support said portable telephone set.

7. A holder according to claim 1, wherein the first engaging portion is formed on one of front and rear end faces of said portable telephone set in a direction in which said portable telephone set is mounted, the grip portion includes a pair of grip portions formed on two side surfaces of said portable telephone set, the second engaging portion is formed on one of front and rear end portions of the storing portion of said single piece housing in correspondence with the first engaging portion, and said catch latch means includes a pair of catch latch means disposed on two side portions of the storing portion of said single piece housing in correspondence with the pair of grip portion.

8. A holder according to claim 1, wherein the first engaging portion is formed on one of front and rear end faces of said portable telephone set in a direction in which said portable telephone set is mounted, the grip portion is formed on the other of the front and rear end faces of said portable telephone set in the direction in which said portable telephone set is mounted, the second engaging portion is formed on one of front and rear end portions of the storing portion of said single piece housing in correspondence with the first engaging potion, and said catch latch means is disposed on the other of the front and rear end portions of the storing portion of said single piece housing in correspondence with the pair of grip portions.

9. A portable telephone set holder comprising:

a portable telephone set having a first engaging portion formed on one of front and rear end faces in a direction in which said portable telephone set is mounted, and a pair of grip portions formed on both side surfaces;

a single piece housing having a second engaging portion to be engaged with the first engaging portion, and a storing portion for storing said portable telephone set, the second engaging portion being formed on one of front and rear end portions of said single piece housing; and a pair of catch latch means disposed on both side portions of the storing portion of said single piece housing in correspondence with the pair of grip portions, each of said catch latch means including a shaft portion which is disposed in the storing portion to be vertically movable, a spring member for biasing the shaft portion upward, a U-shaped grip pawl which is disposed on an upper portion of the shaft portion to be pivotable between a locking position and an unlocking position, and holds the grip portions of said portable telephone set, and a latch mechanism for causing the grip pawl to pivot to the unlocking position to be engaged/disengaged with/from the grip portion of said portable telephone set at a first position of the shaft portion, for locking the shaft portion against a biasing force of the spring member while holding the grip pawl at the locking position to keep the grip pawl engaged with the grip portion of said portable telephone set at a second position, of the shaft portion, which is lower than the first position, and for restoring the shaft portion to the first position with the biasing force of the spring member by unlocking the shaft portion at a third position, of the shaft portion, which is lower than the second position.

10. A portable telephone set holder comprising:

a portable telephone set having a first engaging portion formed on one of front and rear end faces in a direction in which said portable telephone set is mounted, and a grip portion formed on the other of the front and rear end faces of said portable telephone set in the direction in which said portable telephone set is mounted;

a single piece housing having a second engaging portion to be engaged with the first engaging portion, and a storing portion for storing said portable telephone set, the second engaging portion being formed on one of front and rear end portions of said single piece housing; and catch latch means disposed on the other of the front and rear end portions of the storing portion of said single piece housing in correspondence with the grip portion, said catch latch means including a U-shaped grip pawl which is disposed in the storing portion to be vertically movable and pivotable between a locking position and an unlocking position, and holds the grip portion of said portable telephone set, a spring member for biasing the grip pawl upward, and a driving mechanism for causing the grip pawl to pivot to the release position to engage/disengage the grip portion of said portable telephone set with/from the grip pawl at a first position, for holding the grip pawl at the locking position to engage the grip pawl with the grip portion of said portable telephone set, and lock the grip pawl at a second position lower than the first position, and for unlocking the grip pawl to restore the grip pawl to the first position against a biasing force of the spring member so as to disengage the grip portion of said portable telephone set from the grip pawl at a third position lower than the second position.

\* \* \* \* \*